(12) United States Patent
Nakajima

(10) Patent No.: US 7,565,025 B2
(45) Date of Patent: Jul. 21, 2009

(54) IMAGE RECORDING METHOD FOR IMAGE DATA HAVING IMAGE COMPONENTS OF THREE CHANNELS AND A TRANSMISSION RATIO COMPONENT OF ONE CHANNEL, APPARATUS AND COMPUTER READABLE RECORDING MEDIUM STORING PROGRAM

(75) Inventor: Yasumasa Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 504 days.

(21) Appl. No.: 11/185,690

(22) Filed: Jul. 18, 2005

(65) Prior Publication Data

US 2005/0249422 A1  Nov. 10, 2005

Related U.S. Application Data

(63) Continuation of application No. PCT/JP03/16893, filed on Dec. 25, 2003.

(30) Foreign Application Priority Data

Jan. 17, 2003  (JP) ............................. P2003-010009

(51) Int. Cl.
G06K 9/36 (2006.01)
G06K 9/46 (2006.01)

(52) U.S. Cl. ..................................... 382/246

(58) Field of Classification Search ................. 382/162, 382/164, 166, 173, 232, 233, 246, 250, 251, 382/253, 284, 305; 375/240.03, 240.2, 240.21, 375/240.22, 240.23, 208, 367; 348/32, 44; 370/232

See application file for complete search history.

(56) References Cited

U.S. PATENT DOCUMENTS

| | | | | | |
|---|---|---|---|---|---|
| 5,271,043 | A | * | 12/1993 | Fouche et al. | 375/367 |
| 5,703,793 | A | * | 12/1997 | Wise et al. | 382/232 |
| 5,963,543 | A | * | 10/1999 | Rostoker et al. | 370/232 |
| 6,587,590 | B1 | * | 7/2003 | Pan | 382/250 |
| 2004/0022444 | A1 | * | 2/2004 | Rhoads | 382/232 |
| 2005/0249422 | A1 | * | 11/2005 | Nakajima | 382/232 |

FOREIGN PATENT DOCUMENTS

| | | |
|---|---|---|
| JP | 10-224792 A | 8/1998 |
| JP | 11-205788 | 7/1999 |
| JP | 11-331612 | 11/1999 |
| JP | 2000-125111 | 4/2000 |
| JP | 2001-144934 A | 5/2001 |
| JP | 2001-202504 A | 7/2001 |
| JP | 2002-237755 A | 8/2002 |
| JP | 2003-116004 A | 4/2003 |
| JP | 2003-338931 A | 11/2003 |

* cited by examiner

Primary Examiner—Amir Alavi
(74) Attorney, Agent, or Firm—Sughrue Mion, PLLC (57) ABSTRACT

In the structure for image data having image components of three channels and a transmission ratio component of one channel, the image data structure includes an image area in which the image components of three channels are recorded in a compressed format, and a transmission ratio area which has the same data structure as that of the image area and in which a transmission ratio component and pseudo components of two channels having the same compression format as that of the image components are recorded.

19 Claims, 10 Drawing Sheets

IMAGE RECORDING METHOD FOR IMAGE DATA HAVING IMAGE COMPONENTS OF THREE CHANNELS AND A TRANSMISSION RATIO COMPONENT OF ONE CHANNEL, APPARATUS AND COMPUTER READABLE RECORDING MEDIUM STORING PROGRAM

This application is a continuation of PCT/JP03/16893 filed on Dec. 25, 2003.

BACKGROUND OF THE INVENTION

The present invention relates to an image data structure, an image recording method, an image recording apparatus and an image recording program.

In order to represent a color image, three-channel image components such as R/G/B, Y/Cr/Cb are required. Further, since image data is large in its capacity, image data is generally transferred in a compressed data format by means of a removable memory or a communication line. JPEG is widely spread as the compression processing method. The compressed image data can be expanded at a high speed by a hardware processing using an expansion circuit corresponding to the compression method.

Conventionally, there is known image data in which an alpha channel that is a transmission ratio component for composing two images in a superimposing manner or clipping an image is added to image components of three channels (see JP-A-2001-202504, for example).

However, in many cases, the expansion circuit of image data is exclusively designed for expanding image data. For example, in an expansion circuit for the JPEG schema, there arises a case that image data of four channels can not be expanded even if it is image data of the JPEG format. In this case, the transmission ratio component or both the image components and the transmission ratio component is required to be expanded through a software processing. In this manner, there is a problem that the image data of four channels constituted by the image components of three channels and the compressed transmission ratio component is degraded in general-purpose properties.

SUMMARY OF THE INVENTION

The first object of the invention is to provide an image data structure added with a transmission ratio component which is excellent in general-purpose properties.

The second object of the invention is to provide an image recording method, an image recording apparatus and image recording program for recording image data structure added with a transmission ratio component in a format with excellent general-purpose properties.

In order to solve the aforesaid object, the invention is characterized by having the following arrangement.

(1) A structure for image data having image components of three channels and a transmission ratio component of one channel, the image data structure comprising:

an image area in which the image components of three channels are recorded in a compressed format; and a transmission ratio area which has same data structure as a data structure of the image area and in which a transmission ratio component and pseudo components of two channels having same compression format as the compression format of the image components are recorded.

(2) A data structure according to (1), wherein a structure of each of the image area and the transmission ratio area is JPEG format of three channels.

(3) A data structure according to (1), wherein entropy of the pseudo component is zero.

(4) A data structure according to (1), wherein the image components, the transmission ratio component and the pseudo components are recorded in a file.

(5) An image recording method, using a computer, for recording image data having image components of three channels and a transmission ratio component of one channel, the image data recording method comprising:

recording the image components of three channels with a compressed format in an image area; and recording a transmission ratio component and pseudo components of two channels having same compression format as the compression format of the image components in a transmission ratio area with same data structure as the data structure of the image area.

(6) An image recording method according to (5), wherein, in the transmission ratio recording step, the pseudo components having entropy of zero are subjected to a compressing processing same as a compressing processing of the transmission ratio component to output the pseudo components of two channels of the compression format to the transmission ratio area.

(7) An image recording method according to (5), wherein, in the transmission ratio recording step, the pseudo components are quantized with a quantization step width larger than a quantization step width for the transmission ratio component to output the pseudo components of two channels of the compression format to the transmission ratio area.

(8) An image recording method according to (5), wherein, in the transmission ratio recording step, Huffman code having entropy of zero is recorded in the transmission ratio area to record the pseudo components of two channels in the transmission ratio area.

(9) An image recording method according to (5), wherein a structure of each of the image area and the transmission ratio area is JPEG format of three channels.

(10) An image recording method according to (5), wherein the image components, the transmission ratio component and the pseudo components are recorded in a file.

(11) An image recording apparatus for recording image data having image components of three channels and a transmission ratio component of one channel, the image data recording apparatus comprising:

an image recorder that records the image components of three channels with a compressed format in an image area; and a transmission ratio recorder that records a transmission ratio component and pseudo components of two channels having same compression format as the compression format of the image components in a transmission ratio area with same data structure as the data structure of the image area.

The invention is not only specified as an invention of a method but also specified as an invention of a program, an invention of a computer readable recording medium in which the program is recorded, and an invention of an apparatus. Further, the function of each of a plurality of elements provided in the invention may be realized by a hardware resource which function is specified by a construction itself, a hardware resource which function is specified by a program, or the combination thereof. Furthermore, the respective functions of the plurality of means are not limited to ones realized by hardware resources physically independent from one another.

DETAILED DESCRIPTION OF PREFERRED EMBODIMENTS

Hereinafter, embodiments of the invention will be explained.

First Embodiment

Figure 2:
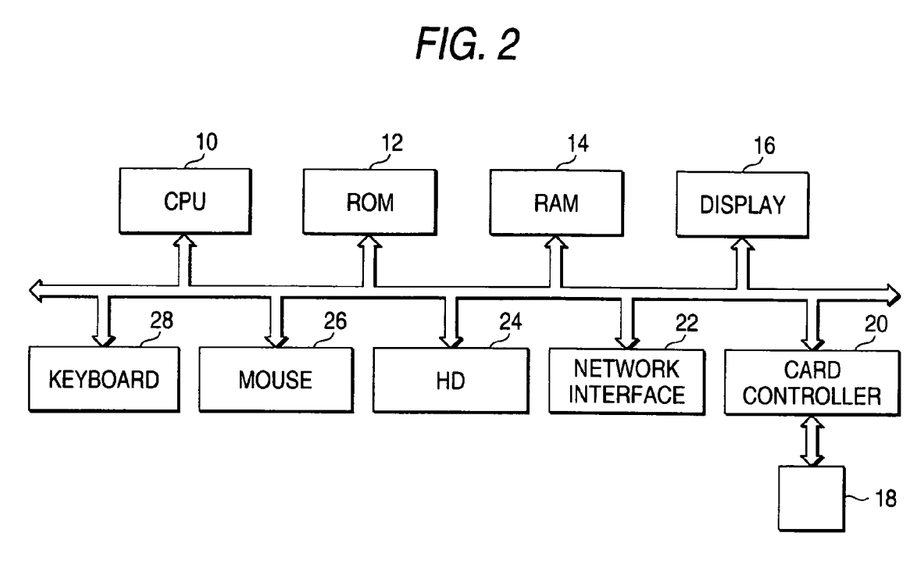
FIG. 2 is a block diagram showing an image recording apparatus according to the first embodiment.

FIG. 2 is a block diagram showing an image recording apparatus according to the first embodiment of the invention. This image recording apparatus is a computer system which executes an image recording program described later to record image data in a removable memory 18. The computer system includes a CPU 10, a ROM 12, a RAM 14, a display 16, a keyboard 28, a mouse 26, a hard disc device 24, a card controller 20, a network interface 22 etc. These respective constituent elements are coupled from one another through a bus.

The CPU 10 executes the image recording program stored in the hard disc device 24 to execute an image data processing described later thereby to control the RAM 14, the display 16, the hard disc device 24, the card controller 20 etc. through a not-shown device controller. The ROM 12 is a non-volatile memory in which a control program and data necessary at the minimum for the CPU 10 to operate is stored in advance. The RAM 14 is a memory in which various kinds of programs and data are temporarily stored. The hard disc device 24 is a non-volatile memory in which an OS and an image recording program are stored. The image recording program and the various kinds of data may be read and inputted from a computer readable recording medium such as the removable memory 18. The card controller 20 controls the read and write operations of the removable memory 18. The network interface 22 is constituted by a modem or a network interface card.

The image data stored in the removable memory 18 and the image data transmitted through the network interface 22 is used in a reproducing apparatus such as a printer, a display, a projector. The reproducing apparatus such as a printer, a display, a projector utilizes the image data according to the embodiment thereby to be able to compose an image component of the image data with other image data by using a transmission ratio component added to the image component thereby to reproduce a composed image.

Figure 3:
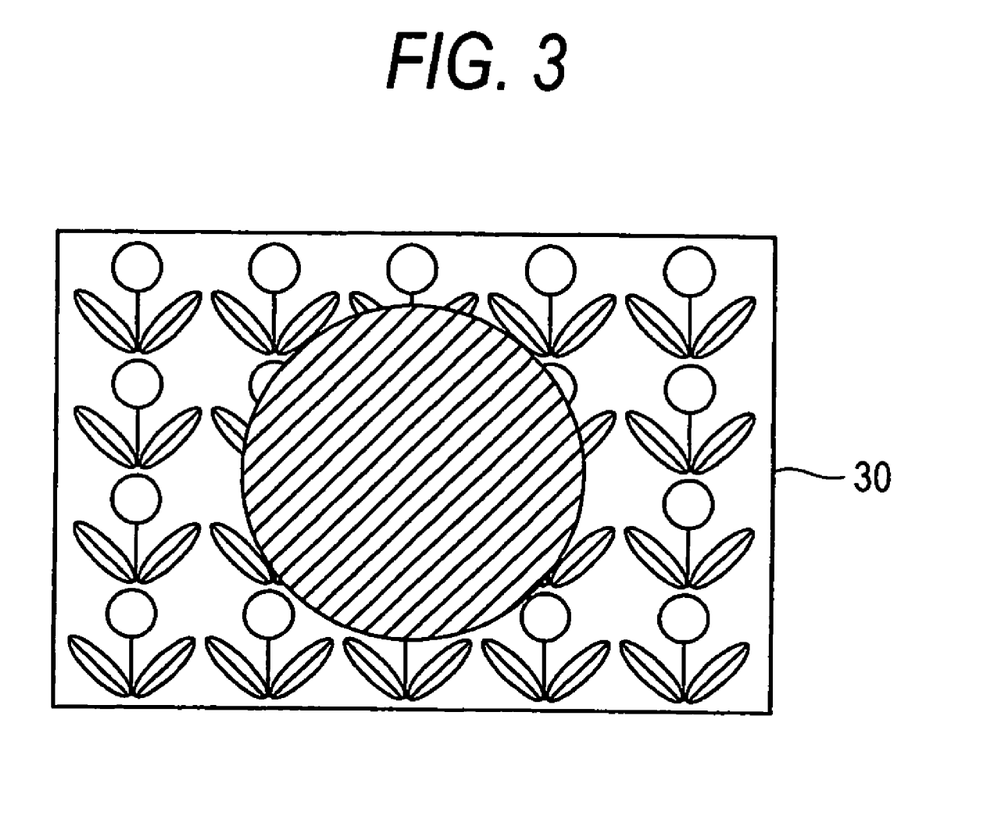
FIG. 3 is a schematic diagram showing an image.
Figure 4:
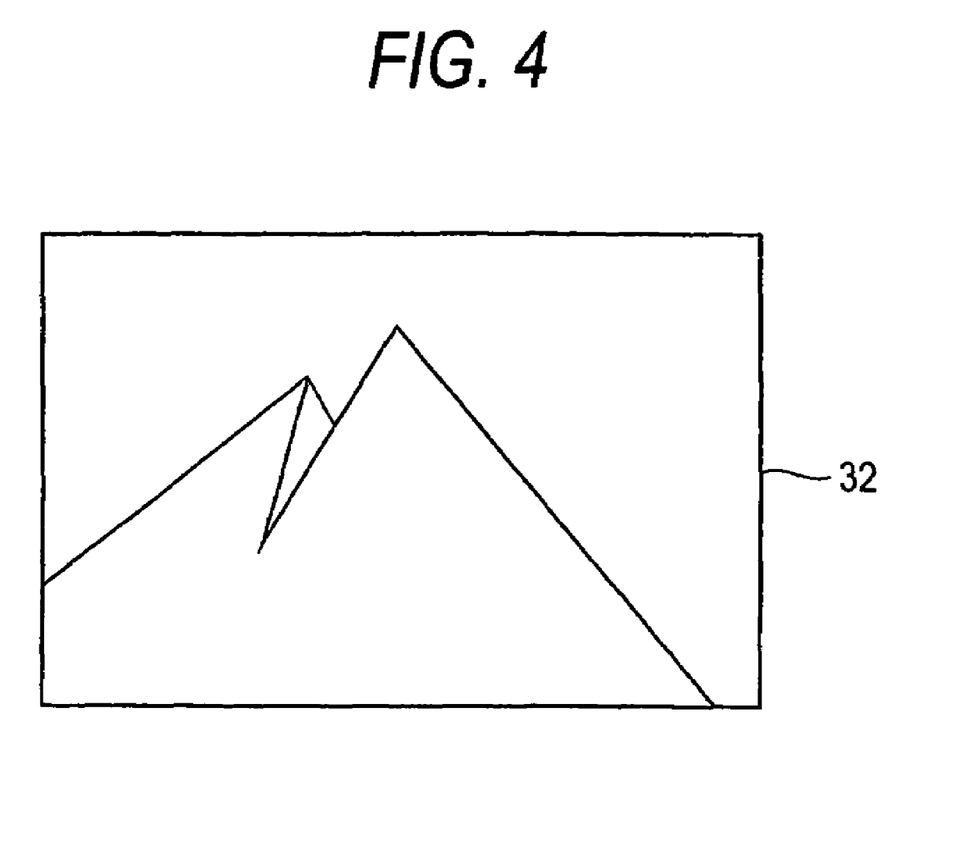
FIG. 4 is a schematic diagram showing an image.
Figure 5:
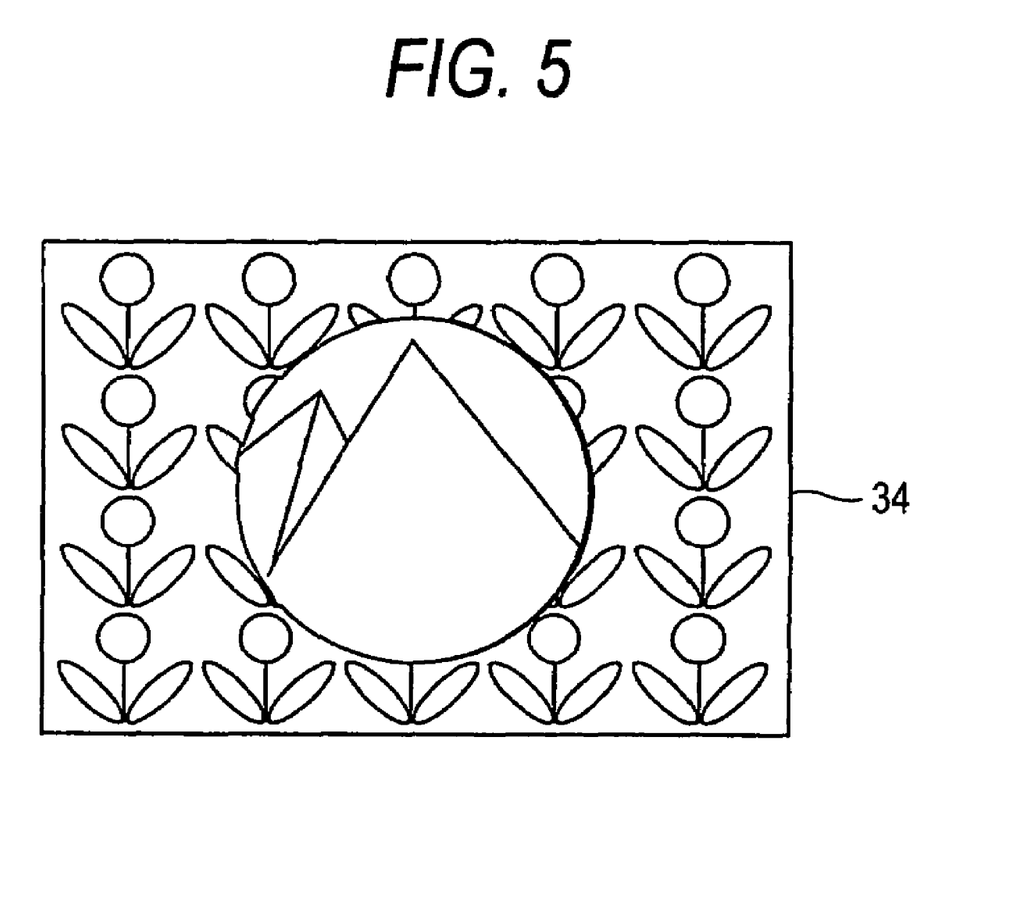
FIG. 5 is a schematic diagram showing a composite image.

FIG. 3 is a schematic diagram showing an image 30 represented by the image data according to the first embodiment of the invention. A hatched area is a transparent area. When another image 32 as shown in FIG. 4 is superimposed on the image 30, a composite image 34 as shown in FIG. 5 is formed in which the another image 32 is fitted into the hatched area.

Figure 6:
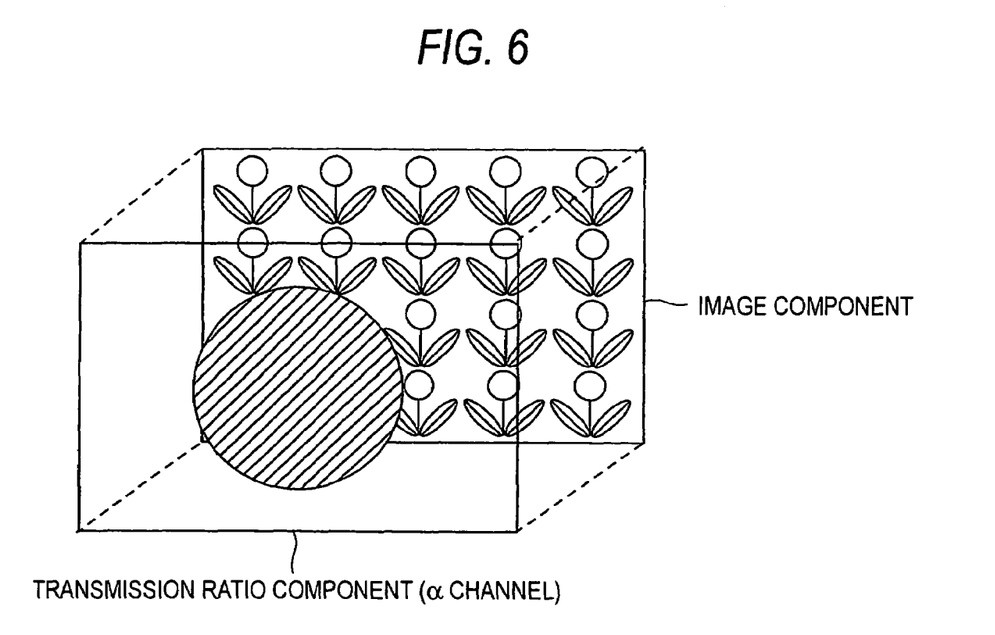
FIG. 6 is a schematic diagram relating to the first embodiment.

FIG. 6 is a schematic diagram for explaining the image component and the transmission ratio component contained in the image data according to the first embodiment of the invention. The image component is constituted by three channel density information of R/G/B, Y/Cb/Cr etc. The density information is formed by thee gradient values recorded at each pixel. The number of levels of each gradient value is an arbitrary and set to be eight, for example. In this case, the image component is recorded by 24 bits per one pixel.

The transmission ratio component is constituted by a transmission ratio information of 1 channel. The transmission ratio information defines the transmission ratio of each pixel of the image component by a gradient values. Hereinafter, the transmission ratio component is called as an alpha channel. Although the level number of the alpha channel is an arbitrary, it is desirably same as the level number of the image component. When the alpha channel is constituted by eight bits, the alpha channel is defined in a manner that 0 represents transparent and 255 represents opaque, for example. The alpha channel can define weightings of two pixels in a processing of forming a pixel of composite image from the two pixels. In the case where a pixel has the alpha channel representing transparent, when an image represented by an image component added with the alpha channel is superimposed and composed with the another image 32 as shown in FIG. 4, the pixels of the another image 32 are displayed in preference to the pixels of the image represented by the image component added with the alpha channel. In contrast, in the similar case, when a pixel has the alpha channel representing opaque, the pixels of the image represented by the image component added with the alpha channel are displayed in preference to the pixels of the another image. In FIG. 6, an area where the alpha channel represents transparent is shown as a hatched area. In this respect, the positioning between an image represented by an image component added with an alpha channel and an image to be superimposed therewith is performed by designating coordinates in a separate process.

Figure 7:
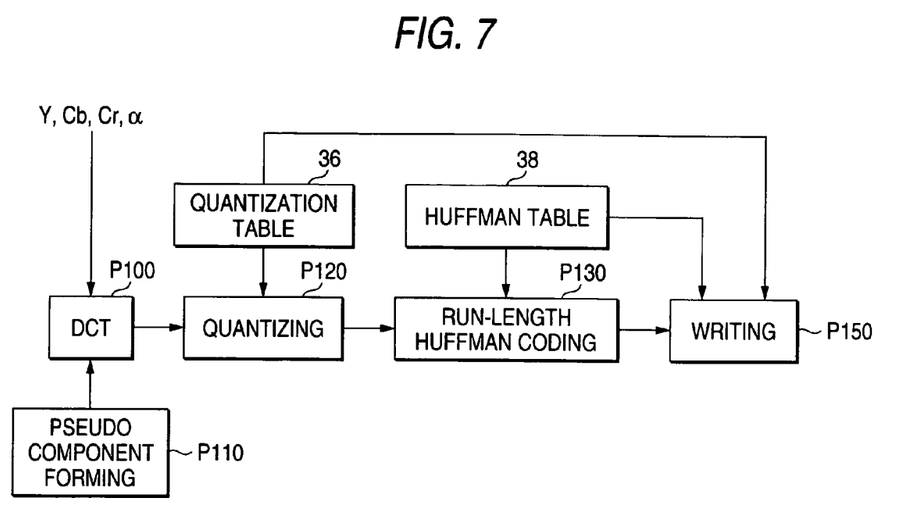
FIG. 7 is a block diagram relating to the first embodiment.

FIG. 7 is a block diagram showing respective means for implementing the image recording processing in the image recording apparatus. Each of the respective means may be realized by a hardware or a software. Hereinafter, the explanation will be made as to a case where each of the respective means is realized by the process of the image recording program. The image recording processing includes a processing of compressing three channel image components, an alpha channel, a first pseudo channel and a second pseudo channel to output the compressed data to the removable memory 18, the hard disc device 24, a communication line etc.

A DCT process P100 implements discrete cosine transformation (DCT) at each block. The DCT process P100 inputs three channel image components such as Y/Cb/Cr, an alpha channel, a first pseudo channel and a second pseudo channel, and outputs DCT coefficients thereof. The three channel image components such as Y/Cb/Cr and the alpha channel are outputted from an image edit program provided separately from the image recording program.

The first pseudo channel and the second pseudo channel are outputted to the DCT process P100 from a pseudo component forming process P110 of the image recording program. Each of the first pseudo channel and the second pseudo channel has a data structure same as that of the alpha channel. That is, the pseudo component forming process P110 outputs two data sets each constituted by the same number of pixels and the same level number of gradient values as those of the alpha channel as the first pseudo channel and the second pseudo channel, respectively. The pseudo component forming process P110 desirably sets all the pixels of the first pseudo channel and the second pseudo channel to the same values such as 0, 255 thereby to set the entropies of the first pseudo channel and the second pseudo channel to 0, respectively. Thus, the compression efficiency of the pseudo component can be enhanced to the maximum degree and so the degree of waste of the capacity of the removable memory 18 due to the pseudo component can be suppressed.

A quantizing process P120 implements the quantization. The quantizing process P120 inputs the DCT coefficients of the three channel image components such as Y/Cb/Cr, the alpha channel, the first pseudo channel and the second pseudo channel and outputs quantized values thereof (quantized DCT coefficients). The representative value of the quantization is stored in a quantization table 36. The quantizing process P120 quantizes the inputted DCT coefficients in a manner that the quantizing process obtains the address of the quantization table where the quantization representative value is stored from the DCT coefficients thus inputted, reads the quantization representative value stored in the address thus obtained and outputs the value thus read as quantized DCT coefficients. Although the different tables 36 are respectively used for the channels, the quantization table having a quantization step width, larger than the quantization step width of the quantization table used for the other channels, is preferably used for each of the first pseudo channel and the second pseudo channel. Thus, the entropy of each of the first pseudo channel and the second pseudo channel can be largely reduced as compared with other channels.

A run-length Huffman encoding process P130 implements coding which is the combination of run length coding and Huffman coding. The run-length Huffman encoding process P130 inputs the quantized DCT coefficients of the three channel image components such as Y/Cb/Cr, the alpha channel, the first pseudo channel and the second pseudo channel, then allocates a Huffman code to each set of values succeeding to a run length and zero run thereof, for example, to output encoded values (Huffman codes). The Huffman code is determined by a Huffman table. The Huffman table is determined by values succeeding to a run length and zero run. The Huffman table used for the encoding is required in order to decode the Huffman code. In order to improve the transportability of the Huffman table, it is desirable to define protocol for uniquely specifying the Huffman table between an encoding processing apparatus and a decoding processing apparatus thereby transmitting information (Huffman table definition information) necessary for constituting the Huffman table used for the encoding to the decoding processing apparatus instead of transmitting the Huffman table itself.

Figure 1:
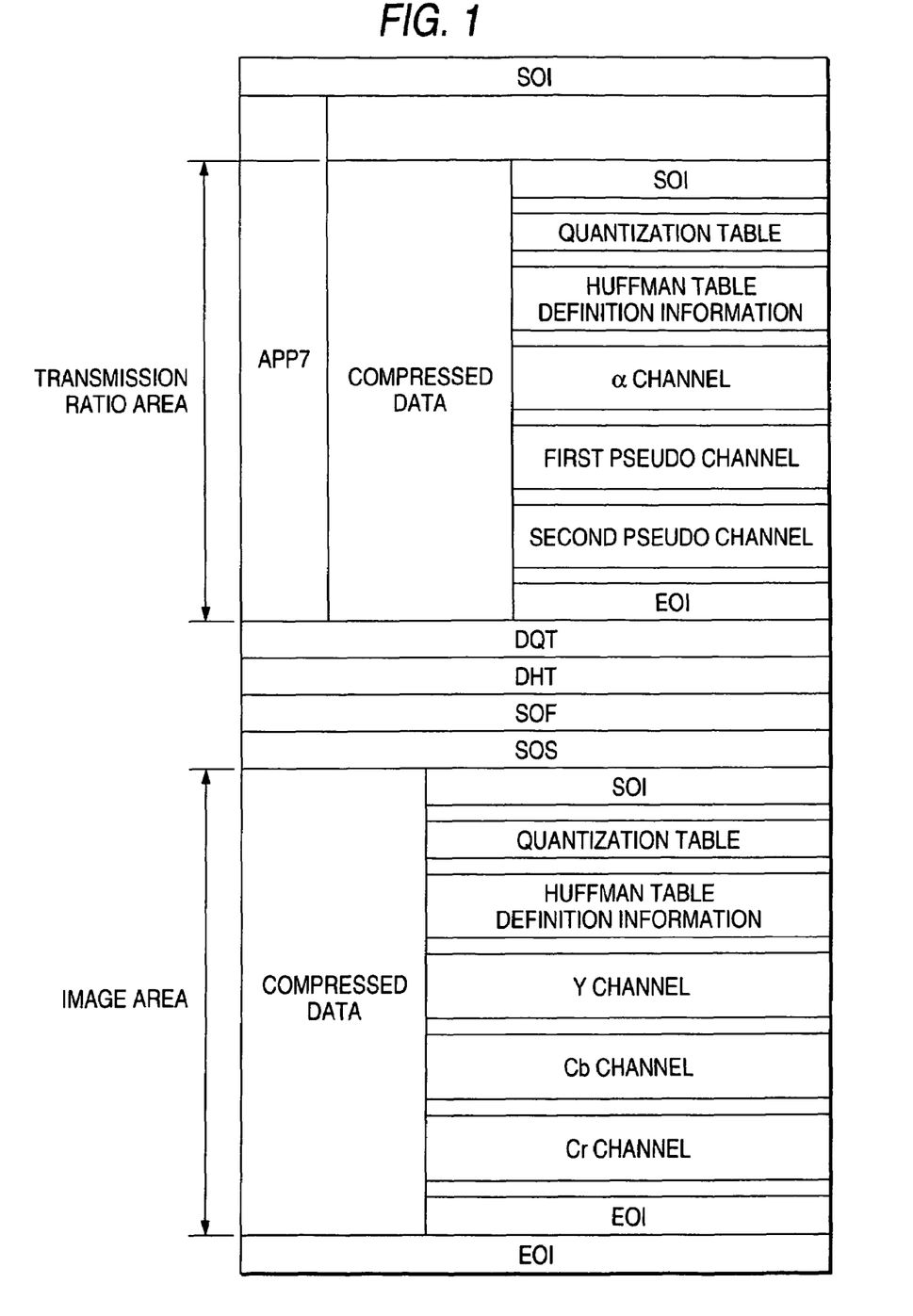
FIG. 1 is a data structure diagram showing the structure of image data according to the first embodiment.

FIG. 1 is a data structure diagram showing the structure of image data according to the first embodiment. A writing process P150 writes image data with the structure shown in FIG. 1 into the removable memory 18. Hereinafter, although the explanation will be made as to a case where data of JPEG compression format is stored in an image area and a transmission ratio area, the compression method and format of data stored in the image area and the transmission ratio area are not limited to the JPEG compression format so long as the compression method of the image area is same as that of the transmission ratio area. To be concrete, wavelet transform, predictive coding, Markov coding etc. may be used as the compression method, for example. Further, the format may not be standardized.

As described above, the image data according to the embodiment is three channel image components added with an alpha channel. Image data is desirably stored in a single file in order to improve the transportability. For example, an image component is stored with the JPEG compression format of three channels in the compressed data area of the image within a file of the JFIF format. Thus, the image component can be decoded as usual JPEG compressed data of three channels. An alpha channel is stored as the JPEG compressed format of three channels in the transmission ratio area within a file together with a first pseudo channel and a second pseudo channel. The transmission ratio area stores data in the compressed data area within APP7 of the JFIF format in the same manner that the compressed data of a thumbnail image is stored within APP1 of the JFIF format, for example. Thus, the alpha channel and the first and second pseudo channels can be decoded as the usual JPEG compressed data of the three channels as it is by cutting out only the APP7 portion. When utilizing the alpha channel, the decoded first and second pseudo channels may be neglected. The explanation of the detailed data structures of the image area and the transmission ratio area is omitted since it is assumed to be same as the JPEG compressed format of three channels.

The image data configured according to the first embodiment is recorded as the JPEG compressed format of three channels for each of the image component and the transmission ratio component, so that each of the image component and the transmission ratio component can be decoded by the same processing method. Accordingly, the image data structure added with the transmission ratio component according to this embodiment is excellent in general-purpose properties.

Second Embodiment

The second embodiment of the invention differs from the first embodiment in the processing of the first and second pseudo channels but is common to the first embodiment in other points.

Figure 8:
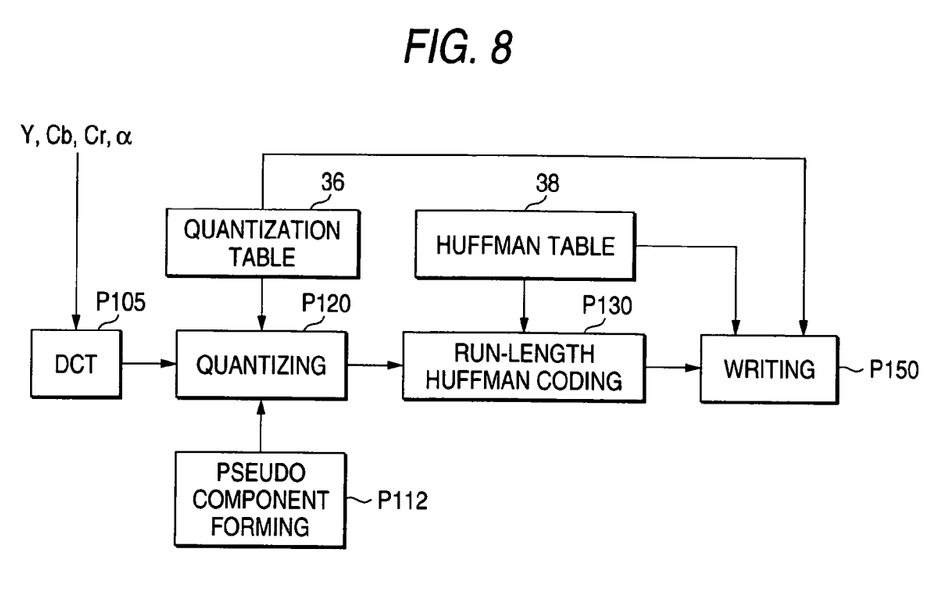
FIG. 8 is a block diagram relating to the second embodiment.

FIG. 8 is a block diagram showing respective means for implementing the image recording processing in the image recording apparatus. A DCT process P105 implements discrete cosine transformation (DCT) at each block. The DCT process P105 inputs three channel image components such as Y/Cb/Cr and an alpha channel and outputs DCT coefficients thereof.

The first pseudo channel and the second pseudo channel are outputted to a quantizing process P120 from a pseudo component forming process P112. Each of the first pseudo channel and the second pseudo channel has a data structure same as that of the DCT coefficients of the alpha channel. That is, the pseudo component forming process P112 outputs two data sets each constituted by the same number of pixels and the same level number of gradient values as those of the alpha channel as the first pseudo channel and the second pseudo channel, respectively. The pseudo component forming process P112 desirably sets all the pixels of the first pseudo channel and the second pseudo channel to the same values such as 0, 255 thereby to set the entropies of the first pseudo channel and the second pseudo channel to 0, respectively. Thus, the compression efficiency of the pseudo component can be enhanced to the maximum degree and so the degree of waste of the capacity of the removable memory 18 due to the pseudo component can be suppressed.

Since the quantizing process P120, a run-length Huffman encoding process P130, a Huffman encoding process P140 and a writing process P150 are same as those of the first embodiment, the explanation thereof is omitted.

Third Embodiment

The third embodiment of the invention differs from the first embodiment in the processing of the first and second pseudo channels but is common to the first embodiment in other points.

Figure 9:
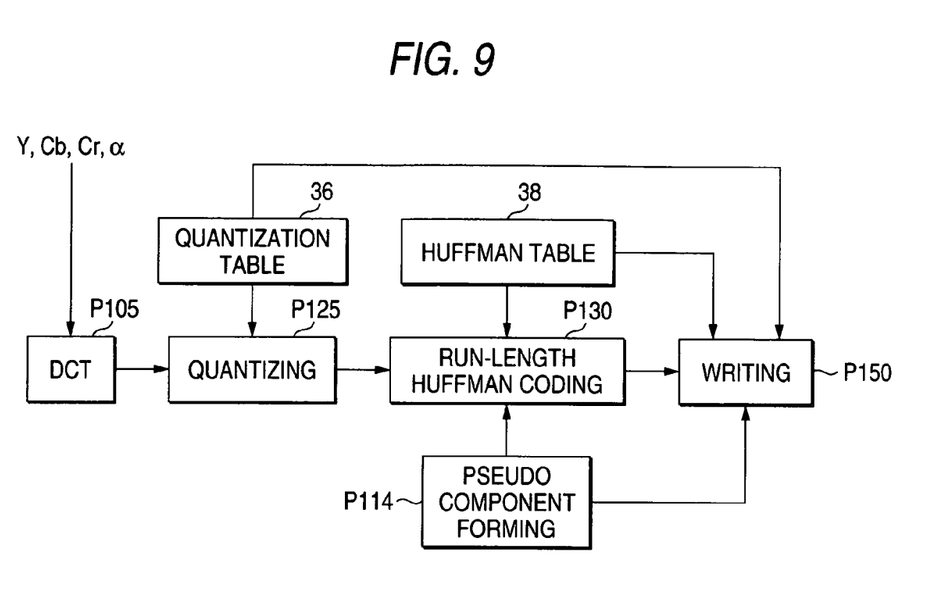
FIG. 9 is a block diagram relating to the third embodiment.

FIG. 9 is a block diagram showing respective means for implementing the image recording processing in the image recording apparatus. A DCT process P105 is same as that of the second embodiment and so the explanation thereof is omitted.

A quantizing process P125 implements the quantization. The quantizing process P125 inputs the DCT coefficients of the three channel image components such as Y/Cb/Cr and the alpha channel and outputs quantized values thereof (quantized DCT coefficients). The representative value of the quantization is stored in a quantization table 36. The quantizing process P125 quantizes the inputted DCT coefficients in a manner that the quantizing process obtains the address of the quantization table where the quantization representative value is stored from the DCT coefficients thus inputted, reads the quantization representative value stored in the address thus obtained and outputs the value thus read as quantized DCT coefficients.

The first pseudo channel and the second pseudo channel are outputted to a run-length Huffman encoding process P130 from a pseudo component forming process P114 of the image recording program. Each of the first pseudo channel and the second pseudo channel has a data structure same as that of the quantized DCT coefficients of the alpha channel. That is, the pseudo component forming process P114 outputs two data sets each constituted by the same number of pixels and the same level number of gradient values as those of the alpha channel as the first pseudo channel and the second pseudo channel, respectively. The pseudo component forming process P114 desirably sets all the pixels of the first pseudo channel and the second pseudo channel to the same values such as 0, 255 thereby to set the entropies of the first pseudo channel and the second pseudo channel to 0, respectively. Thus, the compression efficiency of the pseudo component can be enhanced to the maximum degree and so the degree of waste of the capacity of the removable memory 18 due to the pseudo component can be suppressed. Incidentally, the quantization tables for decoding the first pseudo channel and the second pseudo channel may be outputted from the pseudo component forming process to the writing process. Each of the first pseudo channel and the second pseudo channel has no utility value. Thus, the decoding processing of the first and second pseudo channels is not required to be performed in correspondence to the encoding processing and so may be performed in a meaningless manner. Thus, the contents of the quantization tables for the first pseudo channel and the second pseudo channel may be anything so long as the format thereof is made coincide with that of the quantization table of the alpha channel.

Since the run-length Huffman encoding process P130, a Huffman encoding process P140 and a writing process P150 are same as those of the first embodiment, the explanation thereof is omitted.

Fourth Embodiment

The fourth embodiment of the invention differs from the first embodiment in the processing of the first and second pseudo channels but is common to the first embodiment in other points.

Figure 10:
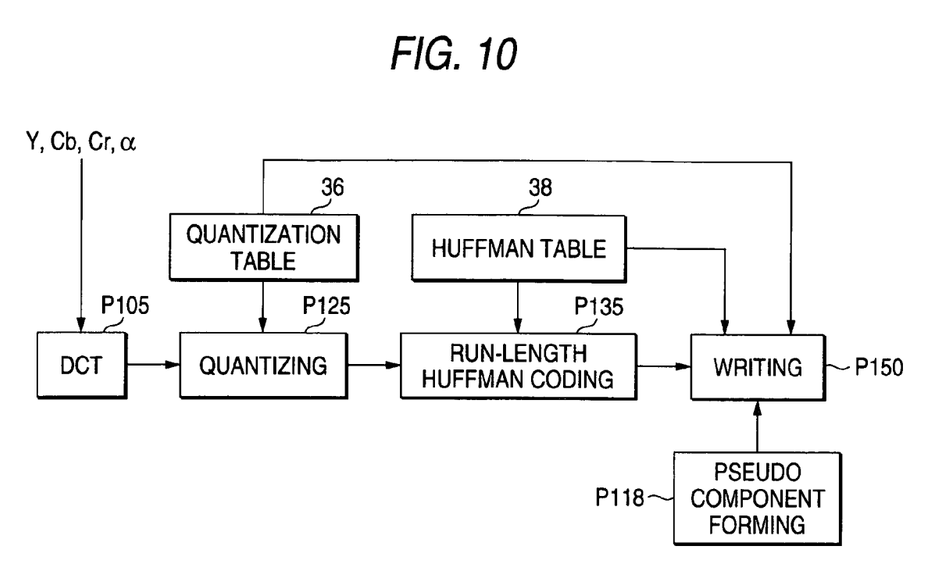
FIG. 10 is a block diagram relating to the fourth embodiment.

FIG. 10 is a block diagram showing respective means for implementing the image recording processing in the image recording apparatus. A DCT process P105 and a quantizing process P125 are same as those of the third embodiment and so the explanation thereof is omitted.

A run-length Huffman encoding process P135 implements coding which is the combination of run length coding and Huffman coding. The run-length Huffman encoding process P135 inputs the three channel image components such as Y/Cb/Cr and the second pseudo channel, then allocates a Huffman code to each set of values succeeding to a run length and zero run thereof, for example, to output encoded values (Huffman codes). The Huffman code is determined by a Huffman table. The Huffman table is determined by values succeeding to a run length and zero run. The Huffman table used for the encoding is required in order to decode the Huffman code. In order to improve the transportability of the Huffman table, it is desirable to define protocol for uniquely specifying the Huffman table between an encoding processing apparatus and a decoding processing apparatus, thereby transmitting information (Huffman table definition information) necessary for constituting the Huffman table used for the encoding to the decoding processing apparatus instead of transmitting the Huffman table itself.

The first and second pseudo channels are outputted from a pseudo component forming process P118 to a writing process P150. Each of the first and second pseudo channels has a data structure same as that of the Huffman code of the alpha channel. The pseudo component forming process P118 desirably outputs at each block the Huffman code of a run-length code which length of zero run coincides with the number of the pixels of one block of the first and second pseudo channels, thereby minimizing the data amount of the first and second pseudo channels. Incidentally, the quantization table and the Huffman table definition information for decoding the first and second pseudo channels may be outputted to the writing process P150 from the pseudo component forming process P118. The contents of the quantization table and the Huffman table definition information of the first and second pseudo channels may be anything so long as the format thereof is made coincide with that of the quantization table and the Huffman table definition information of the alpha channel.

Since the writing process P150 is same as that of the first embodiment, the explanation thereof is omitted.

What is claimed is:

1. An image recording method, using a computer, for recording image data having image components of three channels and a transmission ratio component of one channel, the image data recording method comprising:
   using a computer to carry out the steps of:
   recording the image components of three channels with a compressed format in an image area; and
   recording a transmission ratio component and pseudo components of two channels having same compression format as the compression format of the image components in a transmission ratio area with same data structure as the data structure of the image area.

2. An image recording method according to claim 1, wherein, in the transmission ratio recording step, the pseudo components having entropy of zero are subjected to a compressing processing same as a compressing processing of the transmission ratio component to output the pseudo components of two channels of the compression format to the transmission ratio area.

3. An image recording method according to claim 1, wherein, in the transmission ratio recording step, the pseudo components are quantized with a quantization step width larger than a quantization step width for the transmission ratio component to output the pseudo components of two channels of the compression format to the transmission ratio area.

4. An image recording method according to claim 1, wherein, in the transmission ratio recording step, Huffman code having entropy of zero is recorded in the transmission ratio area to record the pseudo components of two channels in the transmission ratio area.

5. An image recording method according to claim 1, wherein a structure of each of the image area and the transmission ratio area is JPEG format of three channels.

6. An image recording method according to claim 1, wherein the image components, the transmission ratio component and the pseudo components are recorded in a file.

7. An image recording apparatus for recording image data having image components of three channels and a transmission ratio component of one channel, the image data recording apparatus comprising:
  an image recorder that records the image components of three channels with a compressed format in an image area; and
  a transmission ratio recorder that records a transmission ratio component and pseudo components of two channels having same compression format as the compression format of the image components in a transmission ratio area with same data structure as the data structure of the image area.

8. A computer readable recording medium that stores an image recording program for recording image data having image components of three channels and a transmission ratio component of one channel, the image data recording program functioning a computer as:
  an image recorder that records the image components of three channels with a compressed format in an image area; and
  a transmission ratio recorder that records a transmission ratio component and pseudo components of two channels having same compression format as the compression format of the image components in a transmission ratio area with same data structure as a data structure of the image area.

9. The computer readable medium according to claim 8, wherein a structure of each of the image area and the transmission ratio area is JPEG format of three channels.

10. The computer readable medium according to claim 8, wherein entropy of the pseudo component is zero.

11. The computer readable medium according to claim 8, wherein the image components, the transmission ratio component and the pseudo components are recorded in a file.

12. A method of reproducing compressed image data having an image area in which image components of three channels are recorded with a compressed format; and a transmission ratio area which has a same data structure as the data structure of the image area and in which a transmission ratio component and pseudo components of two channels having a same compressed format as the compressed format of the image components are recorded, the method comprising:
  using a computer to carry out the steps of:
  decoding the image area;
  decoding the transmission ratio area; and
  reproducing decoded image data including: the decoded image components of three channels in the decoded image area; and the decoded transmission ratio component of one channel obtained by neglecting the pseudo components of two channels in the decoded transmission ratio area.

13. The method according to claim 12, wherein the image area and the transmission ratio area are decoded by the same processing method.

14. The method according to claim 12, wherein a structure of each of the image area and the transmission ratio area is JPEG format of three channels.

15. The method according to claim 12, wherein the image components, the transmission ratio component and the pseudo components are recorded in a file.

16. An image reproducing apparatus for reproducing compressed image data having an image area in which image components of three channels are recorded with a compressed format; and a transmission ratio area which has a same data structure as the data structure of the image area and in which a transmission ratio component and pseudo components of two channels having a same compressed format as the compressed format of the image components are recorded, the method comprising:
  an image area decoder that decodes the image area;
  a transmission ratio area decoder that decodes the transmission ratio area; and
  an image reproducer that reproduces decoded image data including: the decoded image components of three channels in the image area decoded by the image area decoder; and the decoded transmission ratio component of one channel obtained by neglecting the pseudo components of two channels in the transmission ratio area decoded by the transmission ratio area decoder.

17. The apparatus according to claim 16, wherein the image area and the transmission ratio area are decoded by the same processing method.

18. The apparatus according to claim 16, wherein a structure of each of the image area and the transmission ratio area is JPEG format of three channels.

19. The apparatus according to claim 16, wherein the image components, the transmission ratio component and the pseudo components are recorded in a file.

* * * * *